US012643755B2

(12) United States Patent
Takenaka

(10) Patent No.: US 12,643,755 B2
(45) Date of Patent: Jun. 2, 2026

(54) IMAGE FORMING APPARATUS EXECUTING CALIBRATIONS, CONTROL METHOD, AND STORAGE MEDIUM

(71) Applicant: CANON KABUSHIKI KAISHA, Tokyo (JP)

(72) Inventor: Yoko Takenaka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 18/358,347

(22) Filed: Jul. 25, 2023

(65) Prior Publication Data

US 2024/0034583 A1 Feb. 1, 2024

(30) Foreign Application Priority Data

Jul. 28, 2022 (JP) ................................ 2022-120174

(51) Int. Cl.

*G03G 15/00* (2006.01)
*B41J 29/393* (2006.01)
*B65H 7/02* (2006.01)

(52) U.S. Cl.

CPC .............. *B65H 7/02* (2013.01); *B41J 29/393* (2013.01); *G03G 15/5016* (2013.01); *G03G 15/5041* (2013.01); *G03G 15/553* (2013.01); *B65H 2551/21* (2013.01); *B65H 2551/26* (2013.01); *B65H 2553/20* (2013.01); *B65H 2557/61* (2013.01); *B65H 2801/03* (2013.01); *G03G 2215/00569* (2013.01)

(58) Field of Classification Search

CPC .. G03G 15/55; G03G 15/5041; G03G 15/553; G03G 15/502; G03G 15/5016; G03G 2215/00569; B65H 2557/61; G06K 15/027; B41J 29/393; H04N 1/6033; H04N 1/6027

See application file for complete search history.

(56) References Cited

U.S. PATENT DOCUMENTS

2007/0053701 A1* 3/2007 Nagata .................. G03G 15/55 399/24
2020/0366812 A1* 11/2020 Hirao .................. H04N 1/6033
2023/0138284 A1* 5/2023 Kado .................. G03G 21/181 358/1.9

FOREIGN PATENT DOCUMENTS

JP 2007329929 A 12/2007

* cited by examiner

*Primary Examiner* — Luis A Gonzalez
(74) *Attorney, Agent, or Firm* — Canon U.S.A., Inc. IP Division

(57) ABSTRACT

An image forming apparatus includes a first execution circuit, a second execution circuit, and a display circuit. The first execution circuit is configured to execute a first calibration. The second execution circuit is configured to execute a second calibration. The first display circuit is configured to, in a first notification related to a setting of a calibration, display a first object for prompting the execution of the first calibration and not display a second object for prompting the execution of the second calibration, in a first notification related to a calibration setting.

15 Claims, 14 Drawing Sheets

DIRECTION FROM REAR TO FRONT SIDE OF PAPER: FRONT
DIRECTION FROM FRONT TO REAR SIDE OF PAPER: REAR

FIG.14

1400

| | FLAG NAME | FLAG |
|---|---|---|
| 1401 | DRUM REPLACEMENT DISPLAY REQUIRED_C | YES |
| 1402 | DRUM REPLACEMENT DISPLAY REQUIRED_M | YES |
| 1403 | DRUM REPLACEMENT DISPLAY REQUIRED_Y | NO |
| 1404 | DRUM REPLACEMENT DISPLAY REQUIRED_K | YES |
| 1405 | GUIDANCE SCREEN DISPLAY | YES |

IMAGE FORMING APPARATUS EXECUTING CALIBRATIONS, CONTROL METHOD, AND STORAGE MEDIUM

BACKGROUND

Technical Field

One disclosed aspect of the embodiments relates to an image forming apparatus, a control method, and a storage medium.

Description of the Related Art

In a multi-function peripheral (MFP), the density and gradation characteristics of an output image may vary depending on environmental variations, such as temperature and humidity variations. For this reason, the MFP outputs a calibration pattern according to a built-in pattern, reads the calibration pattern placed on a document positioning plate, and executes a calibration to reflect the correction to a target value, thereby obtaining stable density and gradation characteristics regardless of environmental change.

Japanese Patent Application Laid-Open No. 2007-329929 discusses an image forming apparatus for performing calibration processing in a plurality of modes. Japanese Patent Application Laid-Open No. 2007-329929 discusses an apparatus for displaying a proposal screen, such as "Toner replacement is completed. Execution of a calibration is recommended", at the time of toner replacement. If no calibration has been performed for a predetermined or user-set time period, the apparatus displays a screen for prompting a calibration.

If no calibration is performed at the timing when the proposal screen is displayed at the time of toner replacement as discussed in Japanese Patent Application Laid-Open No. 2007-329929, the user may possibly be unable to recognize the necessity of a calibration afterward. According to Japanese Patent Application Laid-Open No. 2007-329929, if no calibration has been performed for a predetermined or user-set time period, the apparatus displays a screen for prompting a calibration. However, the user may be unable to recognize the necessity of a calibration until the time period has elapsed.

SUMMARY

One aspect of the disclosure has been embodied in view of the above-described points, and is directed to prompting a user to execute a calibration at a suitable timing.

According to an aspect of the disclosure, an image forming apparatus includes a first execution circuit, a second execution circuit, and a first display circuit. The first execution circuit is configured to execute a first calibration. The second execution circuit is configured to execute a second calibration. The first display circuit is configured to, in a first notification related to a setting of a calibration, display a first object for prompting the execution of the first calibration and not display a second object for prompting the execution of the second calibration.

Further features of the disclosure will become apparent from the following description of exemplary embodiments with reference to the attached drawings.

BRIEF DESCRIPTION OF THE DRAWINGS

FIG. 14 illustrates a flag management table.

DESCRIPTION OF THE EMBODIMENTS

Exemplary embodiments of the disclosure will now be described with reference to the accompanying drawings. In the following, the term "unit" may have different meanings depending on the context. The usual meaning is an individual element, single and complete. The phrase "units of" may refer to a plurality of elements or a group of elements. In addition, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials. Furthermore, depending on the context, the term "portion," "part," "device," "switch," or similar terms may refer to a circuit or a group of circuits. The circuit or group of circuits may include electronic, mechanical, or optical elements such as capacitors, diodes, transistors. For example, a switch is a circuit that turns on and turns off a connection. It can be implemented by a transistor circuit or similar electronic devices.

Configuration of Image Forming Apparatus

Figure 1:
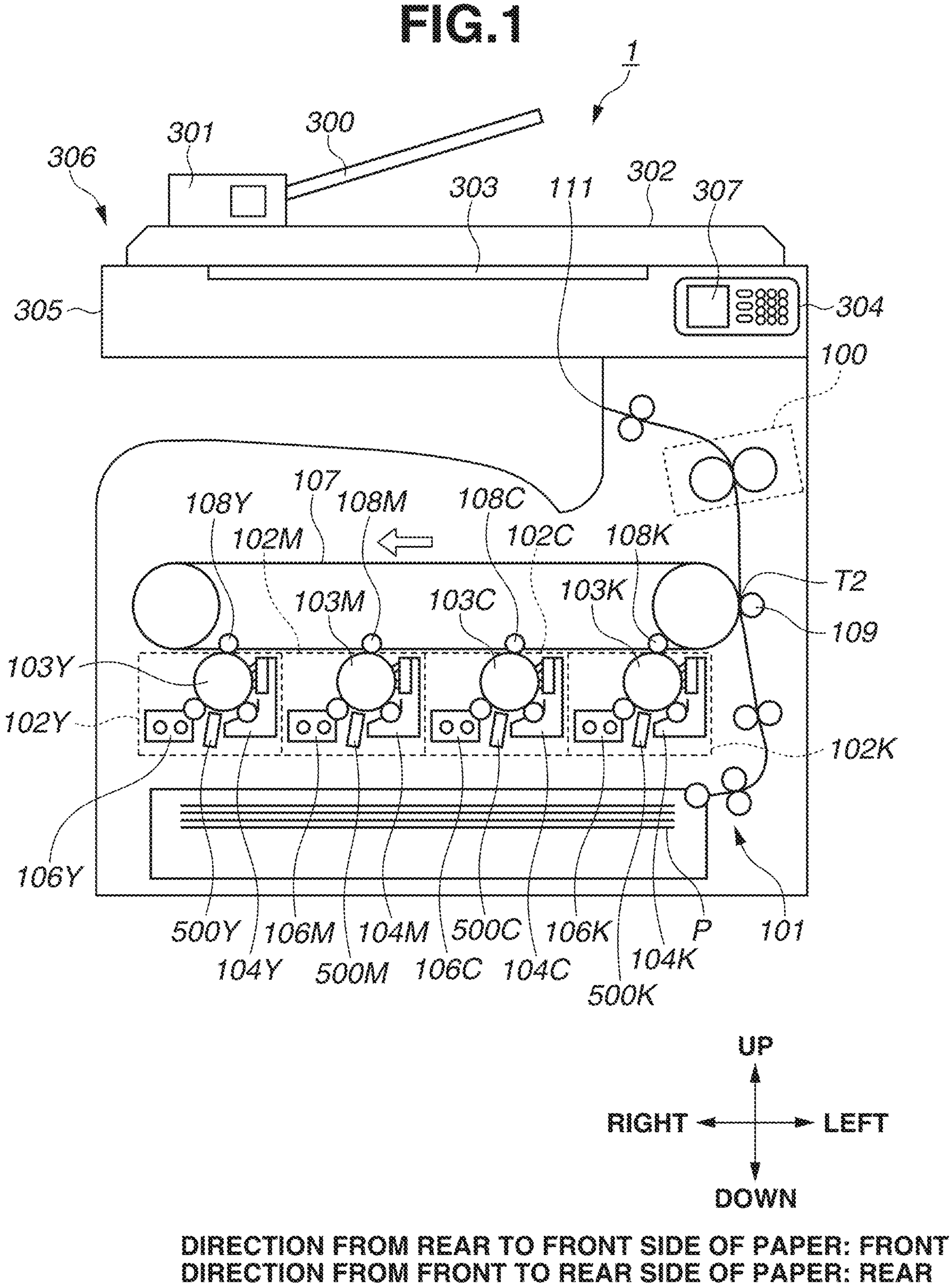
FIG. 1 is a cross-sectional view illustrating an overall configuration of an image forming apparatus according to exemplary embodiments.

FIG. 1 is a cross-sectional view illustrating an overall configuration of an image forming apparatus 1 according to the exemplary embodiments. The image forming apparatus 1 according to the exemplary embodiments is a tandem type color multifunction peripheral.

As illustrated in FIG. 1, the image forming apparatus 1 includes a reader unit or circuit 306 as a reading apparatus. The reader unit or circuit 306 includes a document conveyance apparatus (automatic document feeder) 301 for automatically conveying document sheets, a document reading apparatus 305 for reading an image of a conveyed document, and a document discharge tray 302 for receiving discharged document sheets. The image forming apparatus 1 may not include the document conveyance apparatus 301.

The document conveyance apparatus 301 includes a document feed tray 300 on which document sheets are set, and conveys the document sheets placed on the document feed tray 300 to the document reading position on a glass 303 one by one. The document conveyed to the glass 303 is read by the document reading apparatus 305. Thereafter, the document conveyance apparatus 301 conveys the document and discharges the document onto the document discharge tray 302.

The document reading apparatus 305 includes a scanner and a full-color charge coupled device (CCD) sensor (not illustrated).

The scanner exposes to scan the document on the glass 303 conveyed by the document conveyance apparatus 301. The CCD sensor converts reflected light from the document by the exposure of the scanner into an electrical signal. When the scanner exposes and scans the document, the CCD sensor performs photoelectric conversion. The electrical signal having the red (R), green (G), and blue (B) components representing an image is thereby transmitted to a central processing unit (CPU) 201 (see FIG. 2).

As illustrated in FIG. 1, the image forming apparatus 1 includes an operation unit or circuit 304. The operation unit or circuit 304 includes a display 307 for displaying print condition setting information to the user. The display 307 (described in detail below) displays a status message for notifying the user of the necessity of a calibration, and a guidance screen (guidance notification) for notifying the user of the necessity of a calibration and accepting a calibration execution instruction. Buttons displayed on each screen are also referred to as objects.

The display 307 can display software keys which are touched to be operated by the user's finger. This operation enables the user to input instruction information, such as single-sided or double-sided printing, from an operation panel. The operation unit or circuit 304 includes a start key to be pressed to start an image forming operation, and a stop key to be pressed to stop the image forming operation. A numeric keypad is pressed to perform registration settings. The start key, stop key, and numeric keypad can be displayed not as hardware keys but as software keys. Various data input from the operation unit or circuit 304 is stored in a random access memory (RAM) 203 through the CPU 201 (see FIG. 2).

A configuration of the image forming apparatus 1 will now be described in more detail. As illustrated in FIG. 1, the image forming apparatus 1 includes four image forming units, circuits, or elements 102Y, 102M, 102C, and 102K for forming toner patterns of the Y (yellow), M (magenta), C (cyan), and K (black) colors, respectively.

The image forming units, circuits, or elements 102Y, 102M, 102C, and 102K include photosensitive drums 103Y, 103M, 103C, and 103K, respectively. Hereinafter, these photosensitive drums will also collectively be referred to as "photosensitive drums 103". The image forming units, circuits, or elements 102Y, 102M, 102C, and 102K also includes charging units or circuits 104Y, 104M, 104C, and 104K for charging the photosensitive drums 103Y, 103M, 103C, and 103K, respectively. Hereinafter, these charging units will also collectively be referred to as "charging units 104".

The image forming units, circuits, or elements 102Y, 102M, 102C, and 102K also includes light emitting diode (LED) exposure units 500Y, 500M, 500C, and 500K, respectively, as exposure light sources for emitting light to expose the photosensitive drums 103. The image forming units, circuits, or elements 102Y, 102M, 102C, and 102K also includes developing units or circuits 106Y, 106M, 106C, and 106K, respectively, for developing electrostatic latent images on the photosensitive drums 103 with toner, and developing the toner patterns of different colors on the photosensitive drums 103. Hereinafter, these developing units will also collectively be referred to as "developing units 106". The image forming apparatus 1 illustrated in FIG. 1 employs what is called "lower surface exposure method" for emitting light to the photosensitive drums 103 for exposure from below. The following descriptions will be made on the premise that the image forming apparatus 1 employs the lower surface exposure method. However, the image forming apparatus 1 can employ an "upper surface exposure method" for emitting light to the photosensitive drums 103 for exposure from above.

The image forming apparatus 1 includes an intermediate transfer belt 107 to which the toner patterns formed on the photosensitive drums 103 are transferred, and primary transfer rollers 108Y, 108M, 108C, and 108K for sequentially transferring the toner patterns formed on the photosensitive drums 103 onto the intermediate transfer belt 107. The image forming apparatus 1 also includes a secondary transfer roller 109, and a fixing unit 100 for fixing the secondarily transferred image to the recording paper P. The secondary transfer roller 109 secondarily transfers the toner pattern on the intermediate transfer belt 107 to recording paper P (also referred to as recording sheet or a sheet) conveyed from a paper feed unit or circuit 101. The image forming apparatus can include an electrostatic transportation belt (ETB) instead of the intermediate transfer belt 107. The ETB adsorbs the sheet (paper) by using the electrostatic attraction force, conveys the sheet through the belt rotation, and transfers the toner patterns from the photosensitive drums 103 onto the sheet.

An image forming process will now be described.

The exposure unit 500Y emits light to the surface of the photosensitive drum 103Y charged by the charging unit 104Y for exposure. An electrostatic latent image is thereby formed on the photosensitive drum 103Y. The developing unit 106Y then develops the electrostatic latent image formed on the photosensitive drum 103Y with yellow toner. The yellow toner pattern developed on the surface of the photosensitive drum 103Y is transferred onto the intermediate transfer belt 107 by the primary transfer roller 108Y.

The magenta, cyan, and black toner patterns are also transferred to the intermediate transfer belt 107 with similar image forming processes.

The toner patterns of different colors transferred onto the intermediate transfer belt 107 are conveyed to a secondary transfer portion T2 by the intermediate transfer belt 107. The secondary transfer roller 109 disposed at the secondary transfer portion T2 is applied with a transfer bias for transferring a toner pattern onto the recording paper P. The toner pattern having been conveyed to the secondary transfer portion T2 is transferred onto the recording paper P conveyed from the paper feed unit or circuit 101, by the transfer bias of the secondary transfer roller 109. The recording paper P with the toner pattern transferred thereon is conveyed to the fixing unit 100. The fixing unit 100 fixes the toner pattern to the recording paper P with heat and pressure. The recording paper P having been subjected to the fixing processing by the fixing unit 100 is discharged to a discharge unit 111.

Figure 2:
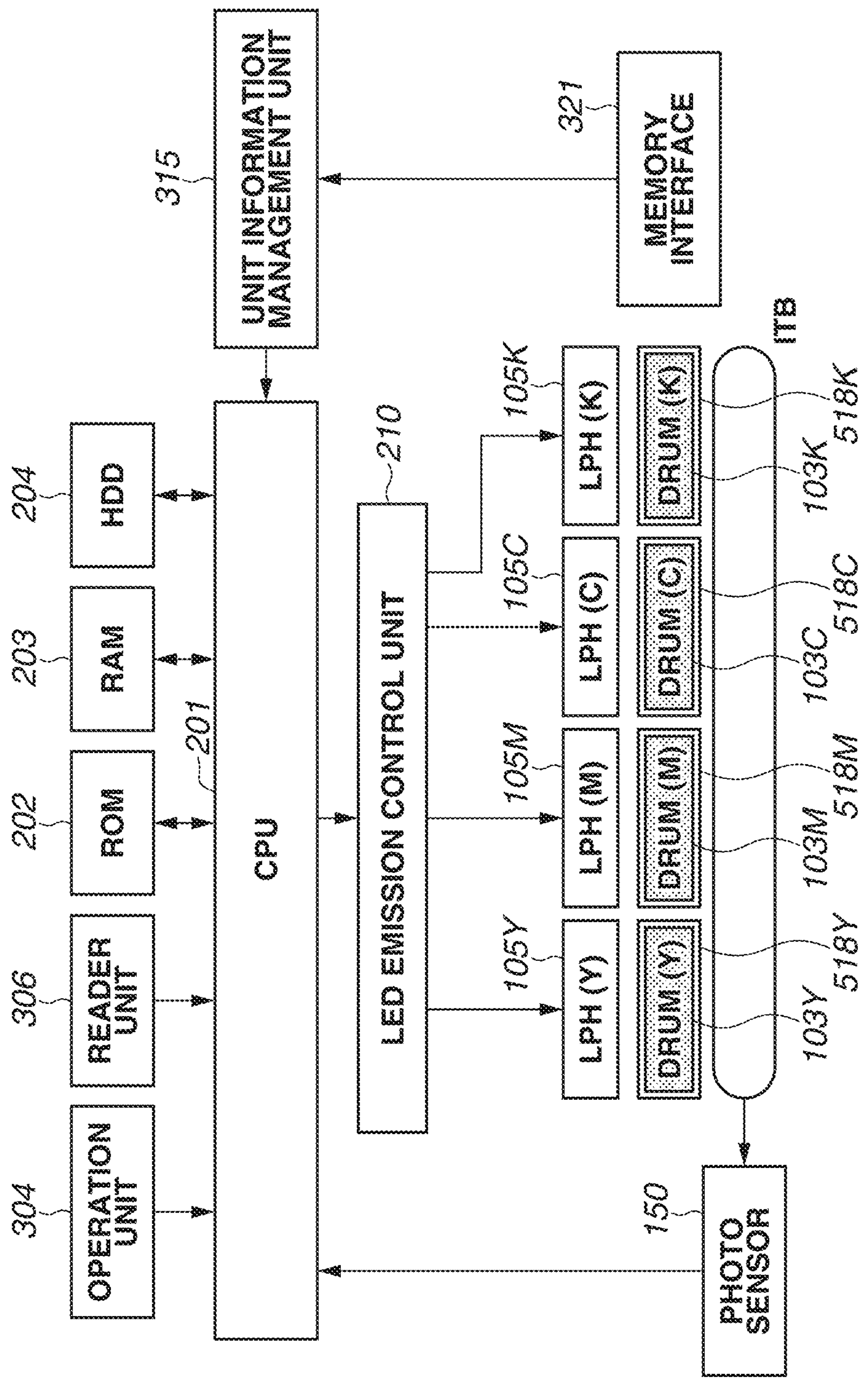
FIG. 2 illustrates a configuration of a control system of the image forming apparatus according to the exemplary embodiments.

A configuration of a control system of the image forming apparatus 1 will now be described with reference to FIG. 2. FIG. 2 illustrates the configuration of the control system of the image forming apparatus 1.

The CPU 201 is a control circuit for controlling each unit. A read only memory (ROM) 202 stores a control program for controlling the drive of optical print heads 105Y, 105M, 105C, and 105K, executed by the CPU 201. Hereinafter, the optical print heads 105Y, 105M, 105C, and 105K are also collectively referred to as "optical print heads 105". The RAM 203 is a system work memory used for the operation of the CPU 201. A hard disk drive (HDD) 204 stores image data transferred from the reader unit or circuit 306 and a personal computer (PC) and setting information input from the operation unit or circuit 304.

A LED light emission control unit or circuit 210 subjects the image data to various types of image processing under the control of the CPU 201 to correct the image data. These color signals are transmitted from the document reading apparatus 305 to the CPU 201, converted into image data (dot data) of different colors by the LED light emission control unit or circuit 210, and input to the optical print heads 105 for different colors. The LED light emission control unit or circuit 210 controls not only the above-described data conversion but also the light emission quantity and the light emission timing of the LEDs (light emitting elements) included in the optical print heads 105. The LED light emission control unit or circuit 210 can be implemented by an integrated circuit, such as an application specific integrated circuit (ASIC) or implemented when the CPU 201 executes a prestored program.

The image data corrected by the LED light emission control unit or circuit 210 is transferred to the respective optical print heads 105. Each of the optical print heads 105 is controlled based on the image data corrected by the LED light emission control unit or circuit 210. The optical print head 105Y emits light to the photosensitive drum 103Y for exposure to form an electrostatic latent image on the photosensitive drum 103Y based on the image data. This operation also applies to other colors.

The toner patterns transferred from the photosensitive drums 103 of different colors to the intermediate transfer belt 107 are detected by a photo sensor 150.

The photosensitive drums 103 of different colors are unitized as drum units or assemblies 518Y, 518M, 518C, and 518K (hereinafter also collectively referred to as "drum units or assemblies 518"). The drum units or assemblies 518 of different colors include a memory electrode 121. The image forming apparatus 1 is provided with a memory interface 321 which is in contact with the memory electrode 121 to acquire information about the drum units or assemblies 518. The information read from the memory electrode 121 by the memory interface 321 is transferred to a unit information management unit 315. The information acquired by the unit information management unit 315 is transferred to the CPU 201. The unit information management unit 315 is illustrated as a block different from the CPU 201 in FIG. 2. However, the CPU 201 can also function as the unit information management unit 315.

Figure 3A:
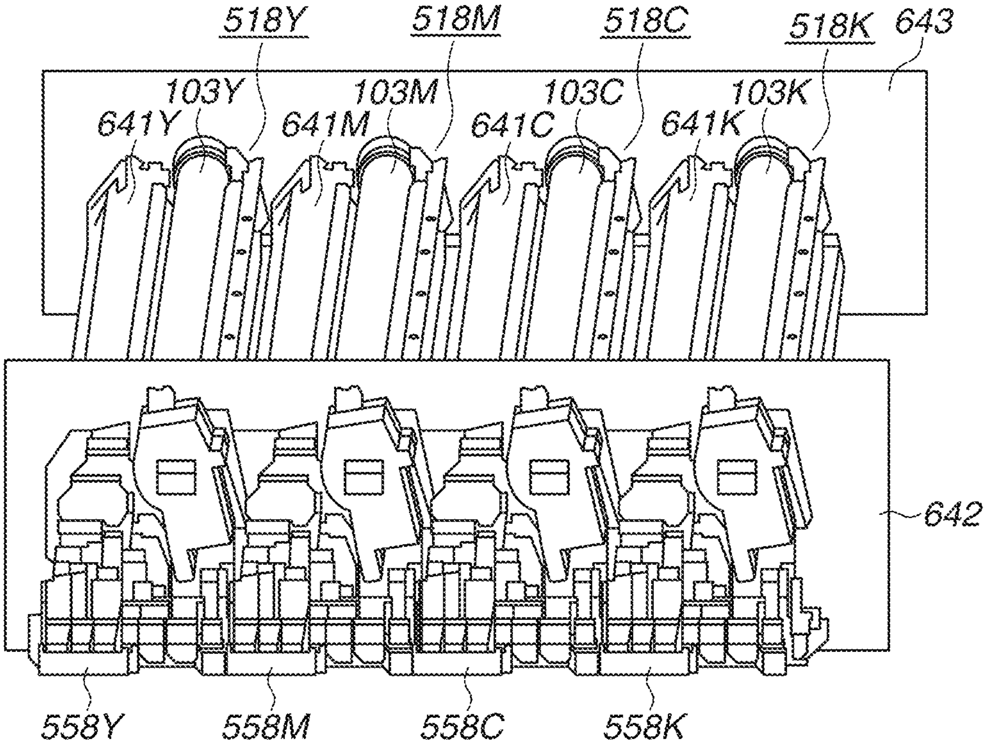
FIGS. 3A and 3B illustrate a structure around drum units.
Figure 3B:
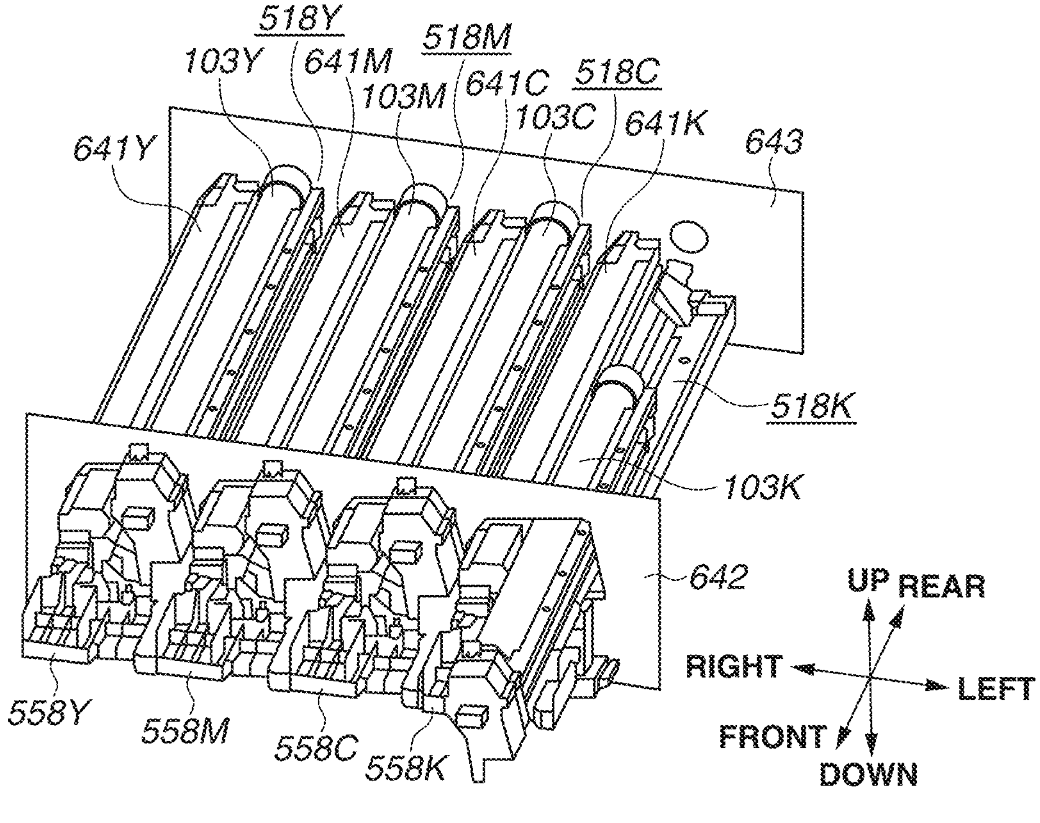

FIGS. 3A and 3B illustrate a structure around the drum units or assemblies 518. FIG. 3A is a perspective view illustrating an overall structure around the drum units or assemblies 518 and the developing units or assemblies 641. FIG. 3B illustrates a state where the drum units or assemblies 518 are inserted into the main body of the image forming apparatus 1. In the following descriptions, the front side (or near side) refers to the side where the drum units or assemblies 518 are inserted into and removed from the main body of the image forming apparatus 1. The front side also refers to the side where the user stands to operate the image forming apparatus 1. The rear side (back side or depth side) is the side opposite to the front side. The defined directions are illustrated in FIG. 3B. The rotational axis directions of the photosensitive drums 103 coincide with the rear-front direction illustrated in FIGS. 3A and 3B.

The drum units or assemblies 518 as exchangeable cartridges are attached to the image forming apparatus 1. The user inserts and removes the drum units or assemblies 518 into/from the image forming apparatus 1 through the lateral side of the apparatus main body to change the drum.

The drum units or assemblies 518 rotatably support the photosensitive drums 103. More specifically, the photosensitive drums 103 are rotatably supported by the frames of the drum units or assemblies 518. The drum units or assemblies 518 may not include the charging units 104 or cleaning apparatuses.

The image forming apparatus 1 is attached with developing units or assemblies 641Y, 641M, 641C, and 641K as units different from the drum units or assemblies 518. Hereinafter, these developing units are also collectively referred to as "developing units or assemblies 641". The developing unit or assembly 641 is a cartridge integrating the developing unit 106 illustrated in FIG. 1 and a toner storage unit. The developing unit 106 includes a developing sleeve (not illustrated) for carrying developer. The development unit or assembly 641 includes a plurality of gears for rotating a screw for agitating toner and career. If these gears deteriorate over time, the user detaches the development unit or assembly 641 from the main body of the image forming apparatus 1 and replaces the development unit or assembly 641 with a new one. The drum unit or assembly 518 and the development unit or assembly 641 can be integrated into a cartridge.

As illustrated in FIGS. 3A and 3B, the image forming apparatus 1 includes a front plate 642 formed of a sheet metal, and a back plate 643 similarly formed of a sheet metal. The front plate 642 is a side wall disposed on the front side of the image forming apparatus 1. The front plate 642 forms a part of the housing of the apparatus main body on the front side of the image forming apparatus 1. The back plate 643 is a side wall disposed on the back side of the image forming apparatus 1. The back plate 643 forms a part of the housing of the apparatus main body on the back side of the image forming apparatus 1.

The front plate 642 and the back plate 643 are disposed to face each other and are cross-linked by a sheet metal (not illustrated) as a beam therebetween. The front plate 642, the back plate 643, and the beam (not illustrated) each configure a part of the frame of the image forming apparatus 1.

The front plate 642 is provided with an opening so that the drum units or assemblies 518 and the development units or assemblies 641 can be inserted into and removed from the image forming apparatus 1 on the front side of the image forming apparatus 1. The drum units or assemblies 518 and the developing units or assemblies 641 are attached at predetermined positions of the image forming apparatus 1 via the opening. The image forming apparatus 1 includes covers 558Y, 558M, 558C, and 558K (hereinafter collectively referred to as "covers 558") for covering the front side of both the drum units or assemblies 518 and the development units or assemblies 641 attached at the predetermined positions. One end side of each cover 558 is fixed to the main body of the image forming apparatus 1 by a hinge so that the cover 558 is rotatable relative to the image forming apparatus 1 by the hinge. The user opens the cover 558, takes out the drum unit or assembly 518 or the development unit or assembly 641 from the apparatus main body, inserts a new drum unit or assembly 518 or a new development unit or assembly 641, and closes the cover 558, thus completing replacement procedures.

Figure 4:
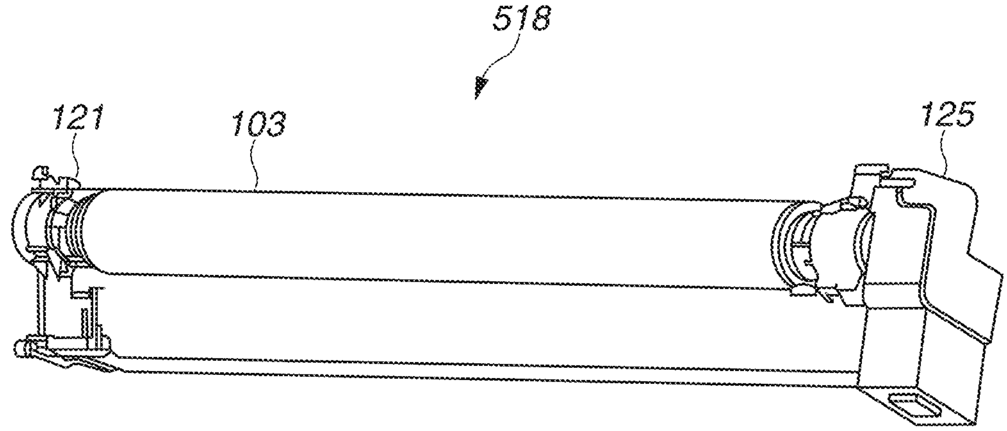
FIG. 4 is a perspective view illustrating a drum unit.

FIG. 4 is a perspective view illustrating the drum unit or assembly 518. The drum units or assemblies 518 for different colors substantially have the same configuration. As illustrated in FIG. 4, the drum unit or assembly 518 includes the photosensitive drum 103, and a frame 125 rotatably supporting the photosensitive drum 103. The frame 125 is positioned relative to the main body of the image forming apparatus 1. The drum unit or assembly 518 is attached to and detached from the apparatus main body by being inserted into and removed from the main body of the image forming apparatus 1 along the rotational axis direction of the photosensitive drum 103.

As illustrated in FIG. 4, the frame 125 is provided with the memory electrode 121. The memory electrode 121 stores information, such as the serial number and printable term of the drum unit or assembly 518 provided with the memory electrode 121. The electrode portion made of a metal comes into contact with the memory interface 321 on the image forming apparatus 1 to enable information communication. Other examples of the memory electrode 121 include a radio frequency identification (RFID) tag, bar code, and Quick Response (QR) Code®.

The tag is not limited to such a contact type but can be a non-contact type tag. The memory electrode 121 can take any form as long as identification information for the drum unit or assembly 518 can be stored therein. The memory electrode 121 includes a memory chip storing information about the drum unit or assembly 518, and communicates information with the memory interface 321 via an electrode terminal. The type of the memory interface 321 can be determined according to the type of the memory electrode 121.

The image forming apparatus 1 is provided with the memory interface 321 as means for communicating with the electrode 121. In the present exemplary embodiment, the memory interface 321 also includes an electrode terminal. When this electrode terminal comes into contact with the electrode terminal of the memory electrode 121, the memory interface 321 acquires information about the drum unit or assembly 518 from the memory electrode 121 via both terminals. When the drum unit or assembly 518 is changed, the memory interface 321 reads the memory electrode 121 to identify whether the drum unit or assembly 518 has been replaced with a new one. Either the memory interface 321 or the CPU 201 can determine whether the drum unit or assembly 518 has been replaced with a new one.

The CPU 201 stores in the RAM 203 information about the date and time when the attachment or replacement of the drum unit or assembly 518 was detected, and adds the printable term read from the memory electrode 121 to thereby determine whether the drum replacement is required or whether the life expectancy of the drum has expired.

The CPU 201 then stores information about the necessity of the drum replacement in the RAM 203.

While the memory interface 321 is in contact with the memory electrode 121, the memory interface 321 always detects the contact. When the drum unit or assembly 518 is detached from the image forming apparatus 1 and the memory electrode 121 and the memory interface 321 come out of contact with each other, the CPU 201 thereby recognizes that the drum unit or assembly 518 has been detached from the image forming apparatus 1. The memory interface 321 can also identify whether the drum unit or assembly 518 is in a state of being attached to the image forming apparatus 1 by periodically reading the information in the memory electrode 121. Thus, the CPU 201 recognizes that the drum unit or assembly 518 has been once detached if the drum unit or assembly 518 has once been detached and attached back to the image forming apparatus 1.

A first exemplary embodiment will now be described with reference to FIGS. 5 to 11.

In the present exemplary embodiment, the image forming apparatus 1 functions as an information processing apparatus.

Figure 5:
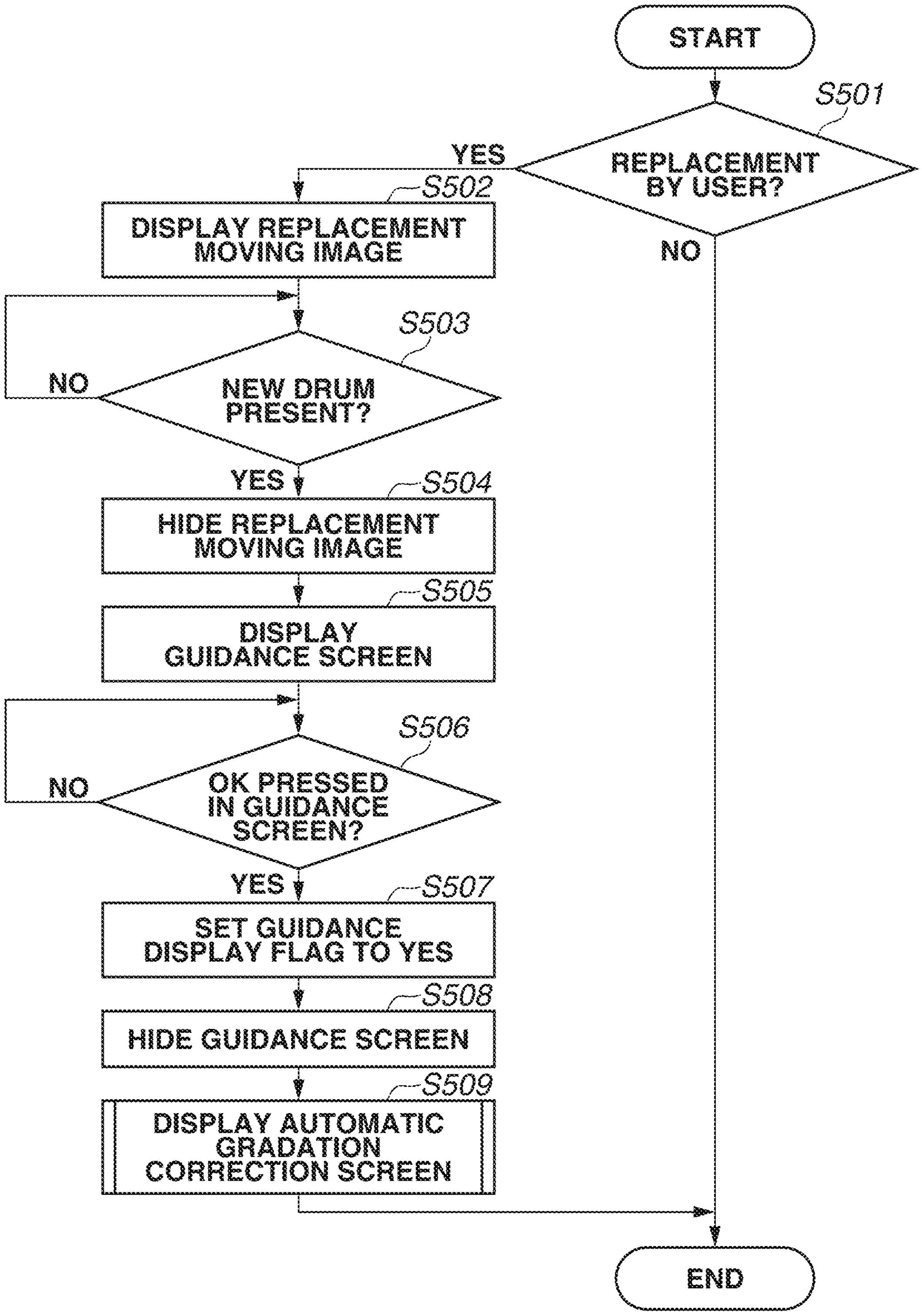
FIG. 5 is a flowchart illustrating processing for executing a calibration based on a guidance screen according to a first exemplary embodiment.

FIG. 5 is a flowchart illustrating processing performed by the image forming apparatus 1. The processing of this flowchart is started when the CPU 201 detects that the drum replacement is required based on the information indicating a failure of the drum unit or assembly 518 of the image forming apparatus 1 or the necessity of the drum replacement stored in the RAM 203. The processing of this flowchart is implemented when the CPU 201 executes a program stored in the ROM 202 or the HDD 204. The CPU 201 is an execution unit or circuit that executes a calibration.

In step S501, the CPU 201 determines whether the drum replacement is to be performed by the user. When the CPU 201 determines that the drum replacement is to be performed by the user (YES in step S501), the processing proceeds to step S502.

When the CPU 201 determines that the drum replacement is not to be performed by the user (NO in step S501), the processing of the flowchart ends.

The cases where the drum replacement is not to be performed by the user include a case where the drum replacement is to be performed by, for example, a service staff. A method for determining whether the drum replacement is to be performed by the user will be described with reference to a flag management table 1400 illustrated in FIG. 14. The flag management table 1400 manages drum replacement display flags 1401 to 1404 indicating whether the drum replacement message display is required for the drum units or assemblies 518, and a guidance screen display flag 1405 indicating whether to display a calibration setting screen 900 from a guidance screen 800 (described below). The flag management table 1400 is stored in the RAM 203 or the HDD 204. The drum replacement display flags 1401, 1402, 1403, and 1404 correspond to the drum units or assemblies 518Y, 518M, 518C, and 518K, respectively. If either one of the drum replacement display flags 1401 to 1404 is set to YES, the CPU 201 determines that the drum replacement message display is required. Since the drum replacement message is displayed only in a case of the drum replacement by the user, the CPU determines that the drum replacement is to be performed by the user when any one of these flags is set to YES. In the example in FIG. 14, the drum replacement display flags 1401, 1402, and 1404 are set to YES. Thus, the CPU 201 determines that the drum replacement message display for the drum replacement by the user is required. In contrast, when all of the drum replacement display flags 1401 to 1404 are set to NO (not illustrated), the CPU 201 determines that the drum replacement message display for the drum replacement by the user is not required. The flag management table 1400 is set by a service staff or administrator in advance. With an apparatus for which the drum replacement by the user is required, the drum replacement display flags 1401 to 1404 are set to YES. In contrast, in an apparatus for which the drum replacement by a service staff or administrator is required, the drum replacement display flags 1401 to 1404 are set to NO. The flag management table 1400 in FIG. 14 is prestored in the RAM 203 or the HDD 204 of the image forming apparatus 1, and is usable from when the image forming apparatus 1 is activated for the first time.

Returning back to descriptions of FIG. 5. In step S502, the CPU 201 displays a drum unit replacement moving image 700 illustrated in FIG. 7. The drum unit replacement moving image 700 gives drum replacement instructions to the user through operations for starting or stopping the moving image or a scene skip operation. The drum unit replacement moving image 700 can be closed by selecting a Close button 701 even when the drum unit replacement is not completed. The drum unit replacement moving image 700 appears again when the user selects a maintenance icon (not illustrated) displayed in the status line of the display 307.

In step S503, the CPU 201 determines whether the drum unit or assembly 518 has been replaced with a new one. As described above, the CPU 201 identifies whether the drum unit or assembly 518 has been replaced with a new one, by reading the memory electrode 121 via the memory interface 321. When the CPU 201 determines that the drum unit or assembly 518 has been replaced (YES in step S503), the processing proceeds to step S504. In this way, the CPU 201 acquires information about the drum unit or assembly 518 from the image forming apparatus 1 and identifies whether the drum unit or assembly 518 has been replaced with a new one.

In step S504, the CPU 201 does not display the drum unit replacement moving image 700.

Figure 8:
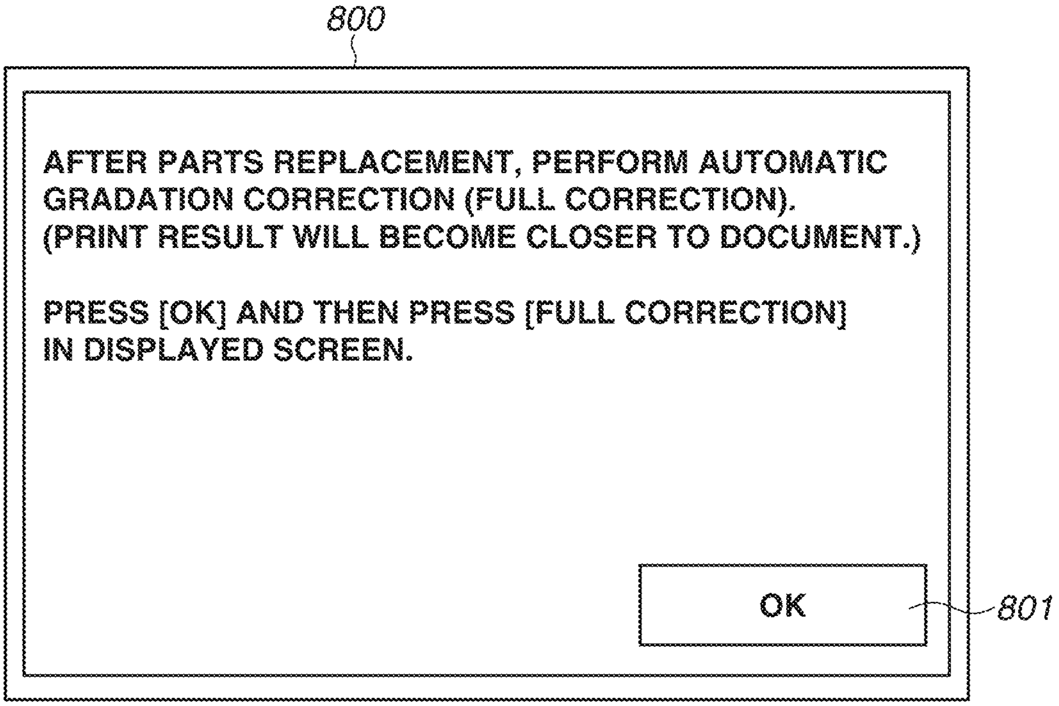
FIG. 8 illustrates an example of a guidance screen.

In step S505, the CPU 201 displays the guidance screen 800 for prompting a calibration on the display 307, as illustrated in FIG. 8. This screen notifies the user that the drum replacement to a new drum unit or assembly 518 is detected and that calibration, such as automatic gradation correction, is required. The guidance screen 800 displays an OK button 801 for displaying the calibration setting screen 900 illustrated in FIG. 9A. The guidance screen 800 in FIG. 8 displays only the OK button 801 for displaying the calibration setting screen 900 in FIG. 9A, and does not display a button for preventing the calibration setting screen 900 from being displayed. This enables suitably guiding the user to perform full correction as a calibration type (described below).

In step S506, the CPU 201 determines whether the OK button 801 is pressed in the guidance screen 800. When the CPU 201 determines that the OK button 801 is pressed (YES in step S506), the processing proceeds to step S507. When the CPU 201 determines that the OK button 801 is not pressed (NO in step S506), the CPU 201 repeats the processing in this step.

In step S507, the CPU 201 sets the guidance screen display flag 1405 to YES. The guidance screen display flag 1405 will be described with reference to the flag management table 1400 in FIG. 14. The guidance screen display flag 1405 is set to NO in the initial state and then set to YES when the OK button 801 is selected in the guidance screen 800. When the calibration setting screen 900 is closed (when the OK button 903 is pressed), the guidance screen display flag 1405 is set to NO again. If the guidance screen display flag 1405 is set to YES when the calibration setting screen 900 is displayed, this indicates that the calibration setting screen 900 has been displayed from the guidance screen 800. In contrast, if the guidance screen display flag 1405 is set to NO, this indicates that the calibration setting screen 900 has not been displayed from the guidance screen 800. The guidance screen display flag 1405 can be changed to NO based on depression of a Start Printing button 1101 illustrated in FIG. 11.

Returning back to descriptions of FIG. 5. In step S508, the CPU 201 hides the guidance screen 800.

In step S509, the CPU 201 executes a calibration execution sub process.

Figure 6:
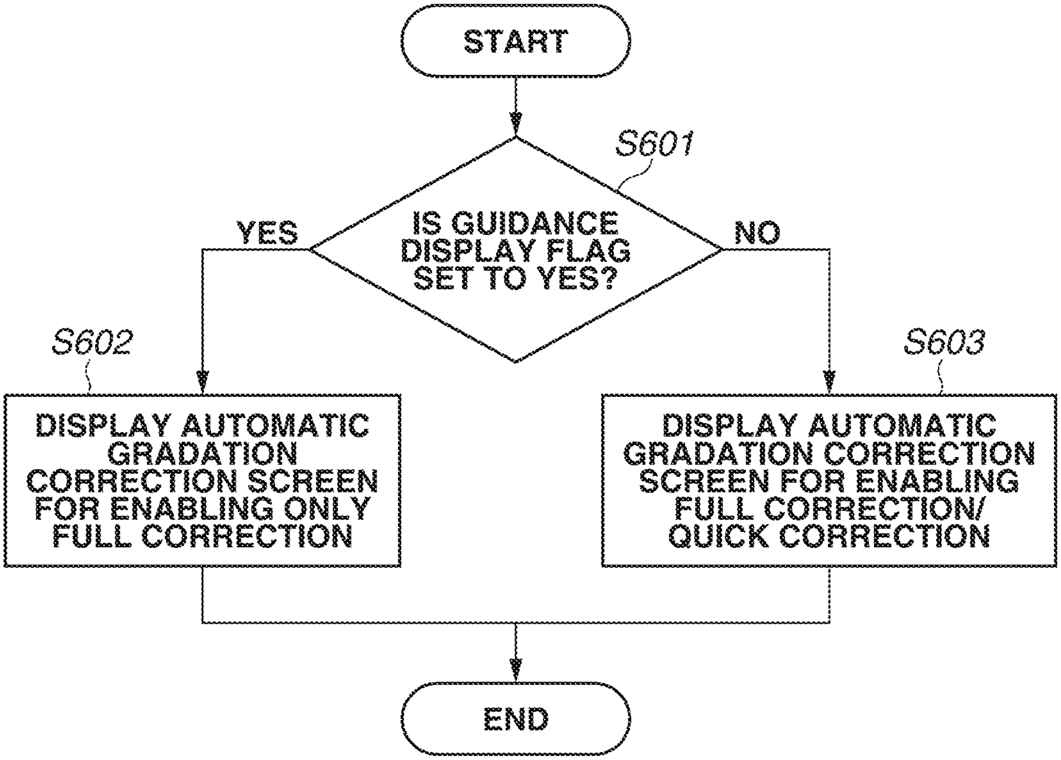
FIG. 6 is a flowchart illustrating processing for displaying a calibration setting screen according to the first exemplary embodiment.
Figure 7:
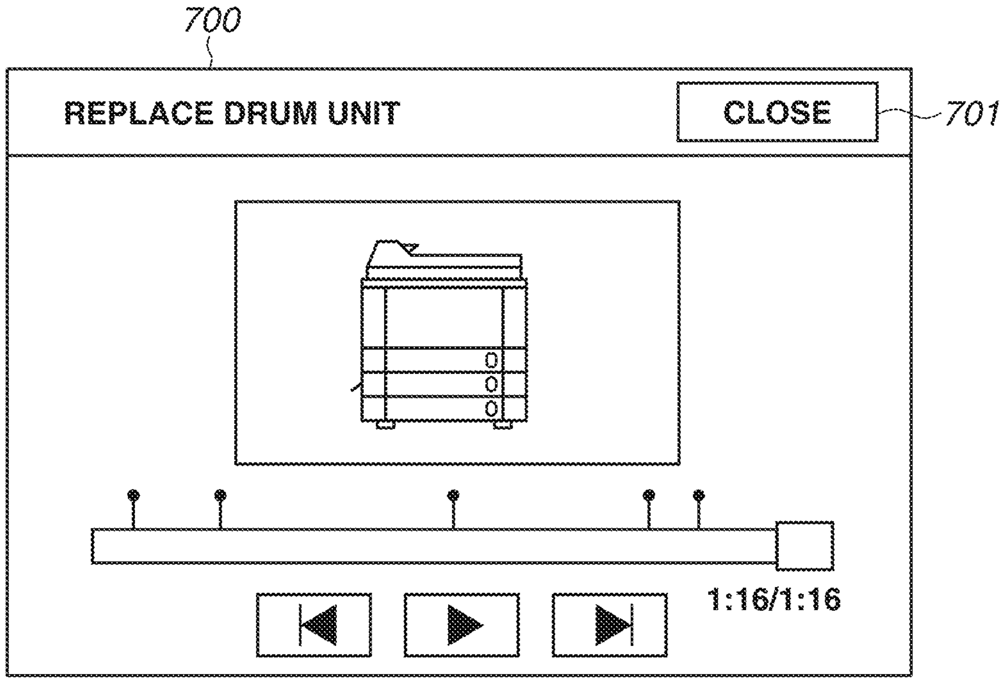
FIG. 7 illustrates an example of a drum unit replacement moving image.

The calibration execution sub process in step S509 will now be described in detail with reference to FIGS. 6 and 9A to 11. FIG. 6 is a flowchart illustrating the calibration execution sub process in step S509. The calibration execution sub process is executed not only in step S509 but also when a regular calibration setting screen (described below) is displayed.

In step S601, the CPU 201 refers to the guidance screen display flag 1405 to determine whether the calibration setting screen 900 has been displayed from the guidance screen 800. When the guidance screen display flag 1405 is set to YES (YES in step S601), the CPU 201 determines that the calibration setting screen 900 is displayed based on depression of the OK button 801 in the guidance screen 800. The processing then proceeds to step S602. In contrast, when the guidance screen display flag 1405 is set to NO (NO in step S601), the CPU 201 determines that the screen 900 has not been displayed from the guidance screen 800. The processing then proceeds to step S603. When the processing of this flowcharts is performed in step S509, i.e., when the guidance screen display flag 1405 is set to YES in step S507, the processing proceeds to step S601.

Figure 9A:
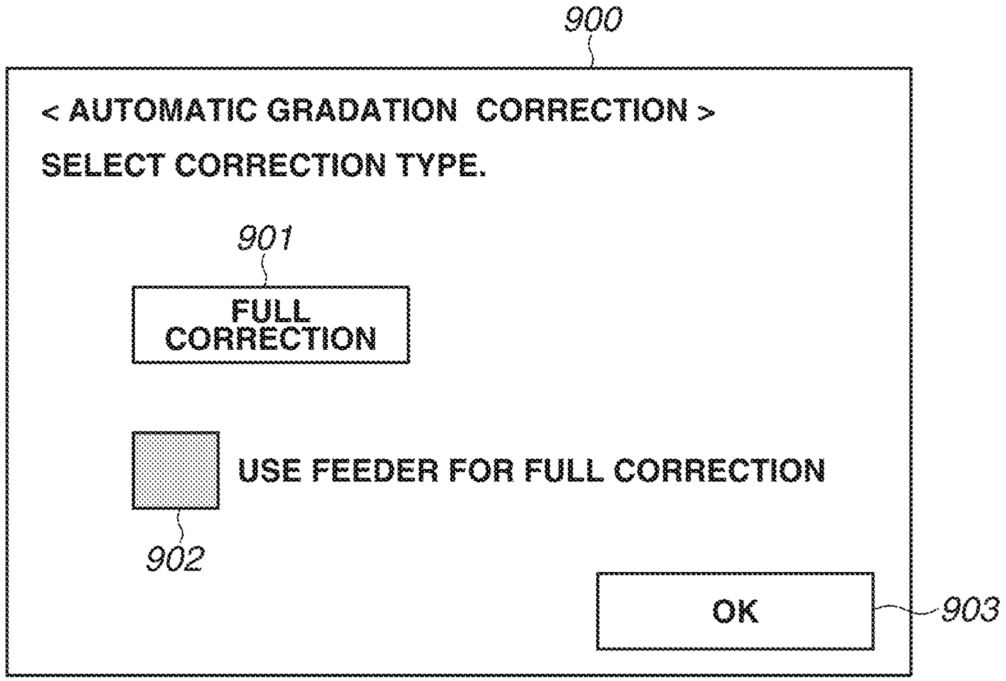
FIGS. 9A and 9B illustrate examples of the calibration setting screen.

In step S602, the CPU 201 displays the calibration setting screen 900 illustrated in FIG. 9A on the display 307. The calibration setting screen 900 in FIG. 9A displays a Full Correction button 901, a Use Feeder for Full Correction button 902, and an OK button 903.

The Full Correction button 901 is used to execute a calibration with a higher accuracy. In full correction, the CPU 201 prints a calibration pattern, reads the calibration pattern via the scanner, and adjusts the tint and gradation output by the image forming apparatus 1. In other words, the CPU 201 executes a calibration using paper. When the Full Correction button 901 is selected, the CPU 201 displays a paper selection screen 1000 illustrated in FIG. 10 (described below). The Use Feeder for Full Correction button 902 is used to select the source of reading the calibration pattern from the scanner at the time of calibration execution: the document conveyance apparatus 301 or a presser plate. When the Use Feeder for Full Correction button 902 is selected by the user, the CPU 201 reads the calibration pattern from the document conveyance apparatus 301. In contrast, when the Use Feeder for Full Correction button 902 is not selected, the CPU 201 reads the calibration pattern from the presser plate. In a case where the image forming apparatus 1 not attached with the document conveyance apparatus 301, the Use Feeder for Full Correction button 902 is not displayed, and only the scanning from the presser plate is enabled.

After the drum unit is replaced, the screen 900 in FIG. 9A does not display correction type buttons other than the Full Correction button 901 to suitably guide the user to perform full correction. In other words, the screen 900 in FIG. 9A does not display a Quick Correction button 904 displayed in FIG. 9B (described below). This enables the user to reliably select the Full Correction button 901 and perform full correction. In the present exemplary embodiment, the screen 900 in FIG. 9A does not display correction type buttons other than the Full Correction button 901. However, the screen 900 in FIG. 9A can be displayed in other forms. For example, the Quick Correction button 904 can be displayed in gray (disabled) not to be selected by the user. For another example, even if the Quick Correction button 904 is selected, a warning can appear to indicate that full correction needs to be performed and, as a result, quick correction is not performed.

Figure 9B:
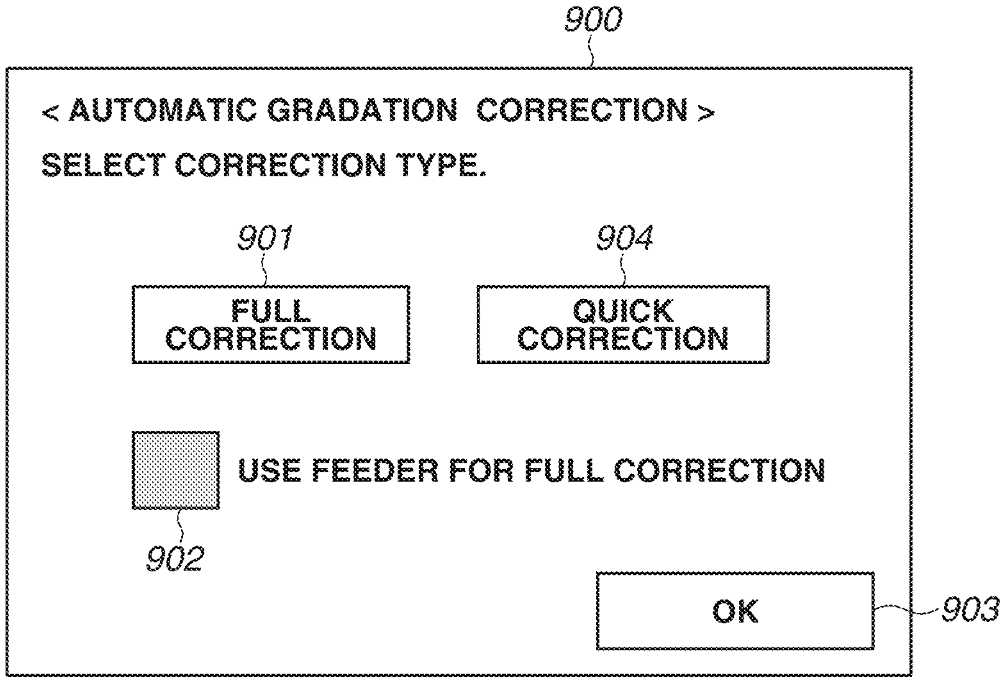
Figure 10:
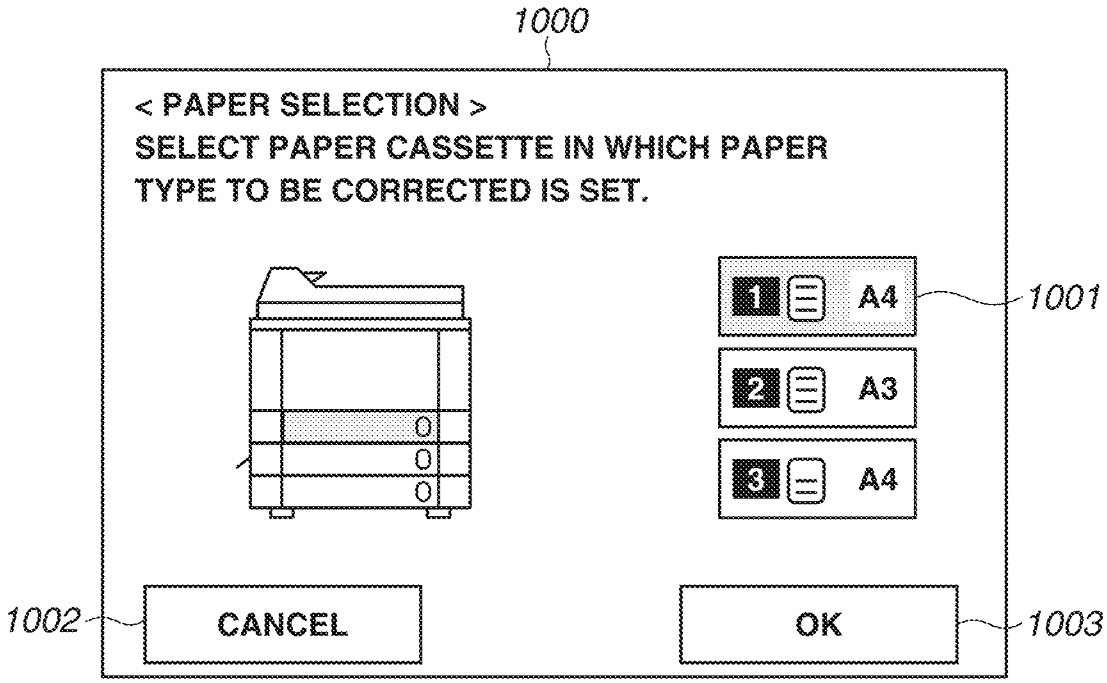
FIG. 10 illustrates an example of a paper selection screen.

FIG. 10 illustrates the paper selection screen 1000 to be displayed when the Full Correction button 901 is selected in the calibration setting screen 900 illustrated in FIG. 9A or 9B. In the paper selection screen 1000, the user selects the paper size to be used to print the calibration pattern. Only the paper feed stage of the usable paper size can be selected. If unusable paper or no paper is set in a paper feed stage, the paper feed state is displayed in gray (disabled).

The example of the paper selection screen 1000 displays a state where a paper feed stage 1001 is selected. When the OK button 1003 is selected, the CPU 201 applies the setting of the selected paper feed stage. When the Cancel button 1002 is selected, the CPU 201 cancels the selection of the paper feed stage and redisplays the calibration setting screen 900.

Figure 11:
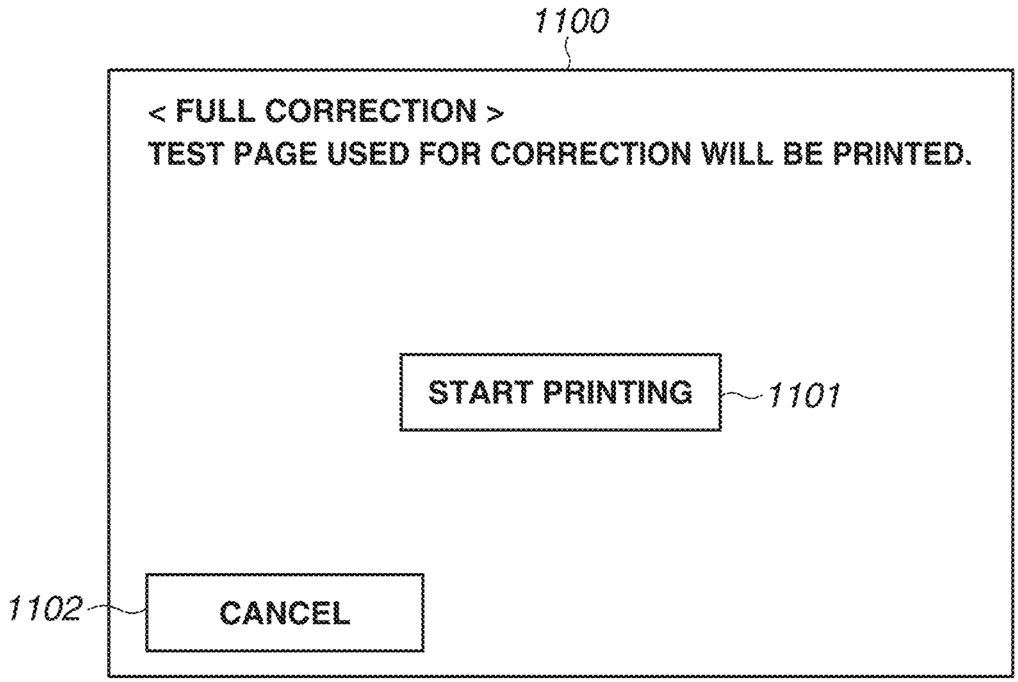
FIG. 11 illustrates an example of a calibration execution screen.

FIG. 11 illustrates a calibration execution screen 1100 displayed when the OK button 1003 is selected in the paper selection screen 1000. When the Start Printing button 1101 is selected, the CPU 201 starts calibration for full correction. When a Cancel 1102 is selected, the CPU 201 redisplays the calibration setting screen 900.

Going back to descriptions of FIG. 6. In step S603, the CPU 201 displays on the display 307 the calibration setting screen 900 illustrated in FIG. 9B. The calibration setting screen 900 in FIG. 9B displays the Full Correction button 901, the Use Feeder for Full Correction button 902, the OK button 903, and the Quick Correction button 904. Selecting the Quick Correction button 904 enables executing a simplified calibration.

FIG. 9B illustrates a regular calibration setting screen (notification) set by the user or administrator. The regular calibration setting screen 900 in FIG. 9B is a screen displayed when a predetermined operation is performed in a display screen different from the guidance screen 800 displayed on the display 307 of the image forming apparatus 1. More specifically, the regular calibration setting screen 900 in FIG. 9B is not displayed when the OK button 801 is pressed in the guidance screen 800 but displayed when the predetermined operation for displaying the regular calibration setting screen 900 is performed. The flowchart in FIG. 6 is executed based on execution of the predetermined operation for displaying the regular calibration setting screen 900. As described above, the guidance screen display flag 1405 is set to YES when the OK button 801 is pressed in the guidance screen 800. Thus, the guidance screen display flag 1405 is set to NO when the flowchart in FIG. 6 is started based on execution of the predetermined operation. In this case, the processing proceeds to step S602.

When the Quick Correction button 904 is selected, the CPU 201 displays a quick correction execution screen (not illustrated) that enables the user to start correction. In quick correction, the CPU 201 executes a simplified calibration requiring neither printing of a calibration pattern nor reading the calibration pattern with the scanner. This means that the CPU 201 executes a calibration without using paper. Quick correction is a calibration having a lower accuracy but having a shorter calibration execution time than full correction because of the smaller number of processing items.

As described above, in the present exemplary embodiment, when the drum unit or assembly 518 is replaced with a new one, the CPU 201 can notify the user of the necessity of a calibration and displays the guidance screen 800 for accepting a calibration execution instruction to prompt a calibration. The CPU 201 also displays the calibration setting screen 900 illustrated in FIG. 9A for prompting the execution of only full correction after the replacement of the drum unit or assembly 518. This enables the user to perform full correction without getting lost in operations after the drum replacement.

A second exemplary embodiment will now be described with reference to FIG. 12.

The first exemplary embodiment has been described above centering on processing in which, when the OK button 801 is selected in the guidance screen 800, the CPU 201 displays the calibration setting screen 900 and the paper selection screen 1000, and prompts the user to set the correction type, set whether to use the feeder for full correction, and select a paper feed stage.

In the second exemplary embodiment, when the OK button 801 is selected in the guidance screen 800, the CPU 201 displays the calibration execution screen 1100 instead of the calibration setting screen 900 and the paper selection screen 1000, and prompts the execution of a calibration.

More specifically, in the present exemplary embodiment, the image forming apparatus 1 most suitably sets items that need to be set in the calibration setting screen 900 and the paper selection screen 1000, and prompts the execution of a calibration with user's setting operations omitted.

Figure 12:
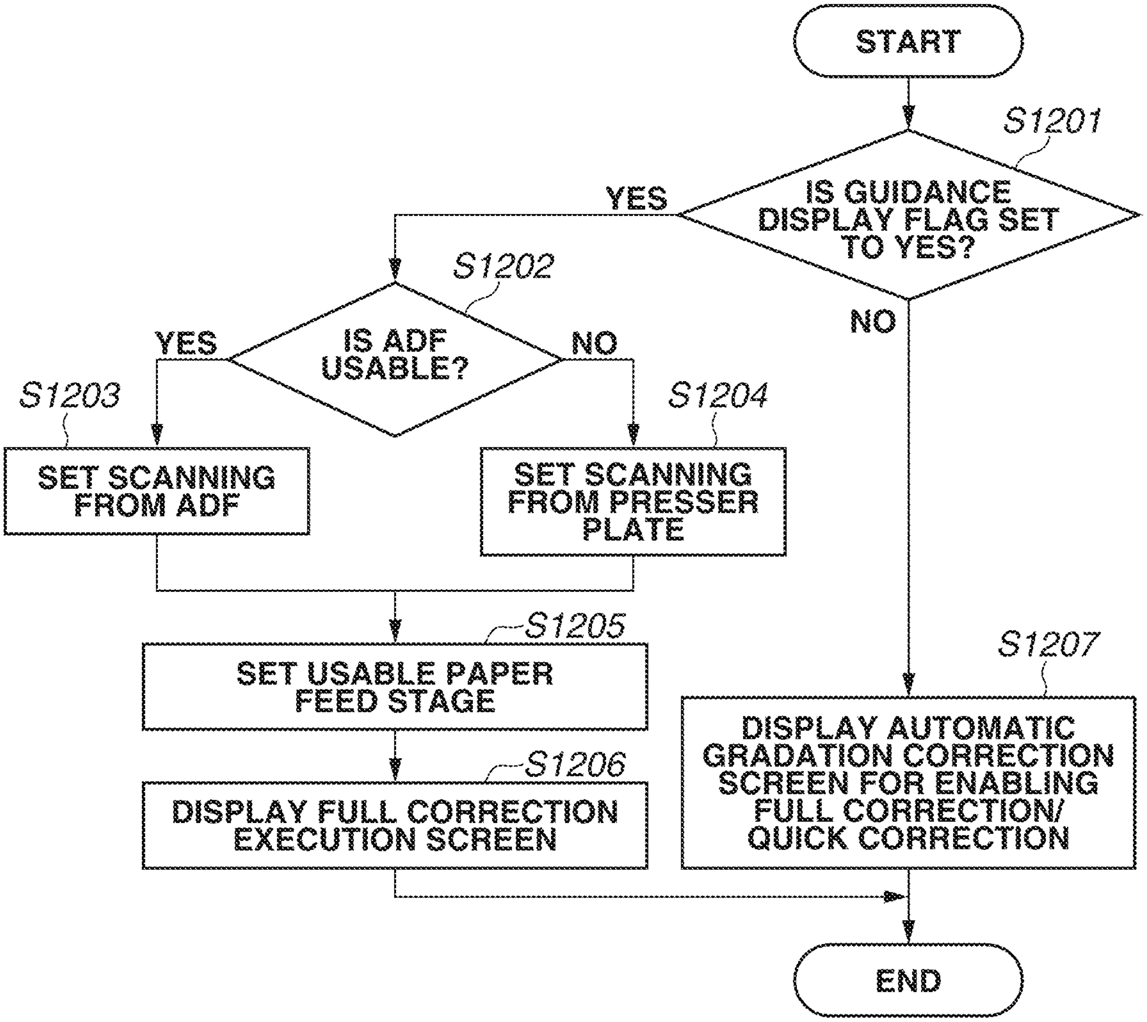
FIG. 12 is a flowchart illustrating processing for displaying a calibration execution screen according to a second exemplary embodiment.

FIG. 12 is a flowchart illustrating processing to be performed by the image forming apparatus 1. The processing of this flowchart is started when the CPU 201 detects that the drum replacement is required based on the information indicating a failure of the drum unit or assembly 518 of the image forming apparatus 1 or the necessity of the drum replacement stored in the RAM 203. The processing of this flowchart is implemented when the CPU 201 executes a program stored in the ROM 202 or the HDD 204. FIG. 12 is a flowchart illustrating processing performed by the image forming apparatus 1.

In step S1201, the CPU 201 refers to the guidance screen display flag 1405 to determine whether the calibration setting screen 900 has been displayed from the guidance screen 800. When the guidance screen display flag 1405 is set to YES (YES in step S1201), the CPU 201 determines that the calibration setting screen 900 has been displayed from the guidance screen 800. The processing then proceeds to step S1202. In contrast, when the guidance screen display flag 1405 is set to NO (NO in step S1201), the CPU 201 determines that the calibration setting screen 900 has not been displayed from the guidance screen 800. The processing then proceeds to step S1207.

The present exemplary embodiment has been described above centering on a method for determining whether the calibration setting screen 900 has been displayed from the guidance screen 800, by using the guidance screen display flag 1405. However, the determination can be performed by using other methods.

In step S1207, the CPU 201 performs similar processing to step S603, and redundant descriptions thereof will be omitted.

In step S1202, the CPU 201 determines whether the document conveyance apparatus 301 can be used by the image forming apparatus 1. In other words, the CPU 201 determines whether the document conveyance apparatus 301 is attached to the reader unit or circuit 306. If the CPU 201 determines that the document conveyance apparatus 301 is usable (YES in step S1202), the processing proceeds to step S1203. In contrast, if the CPU 201 determines that the document conveyance apparatus 301 is not usable (NO in step S1202), the processing proceeds to step S1204.

In step S1203, the CPU 201 sets scanning from an automatic document feeder (ADF). This setting is the same as that in a state where the Use Feeder for Full Correction button 902 is selected in the calibration setting screen 900.

In step S1204, the CPU 201 sets scanning from the presser plate. This setting is the same as that in a state where the Use Feeder for Full Correction button 902 is not selected in the calibration setting screen 900.

In step S1205, the CPU 201 determines the paper usable for calibration and selects the paper feed stage in which the usable paper is set. If the usable paper is set in a plurality of paper feed stages, the CPU 201 selects the paper feed stage assigned with the smallest number, for example. This processing is the same as that in a state where a paper feed stage is selected in the paper selection screen 1000.

In step S1206, the CPU 201 displays the calibration execution screen 1100.

As described above, when the drum unit or assembly 518 is replaced with a new one, the CPU 201 notifies the user of the necessity of a calibration, displays a calibration execution screen 1200 to prompt the execution of a calibration while minimizing the amount of user operations.

Either one of the calibration setting screen 900 and the paper selection screen 1000 may be displayed, and the other screen may not be displayed. In other words, at least one of the calibration setting screen 900 and the paper selection screen 1000 may not be displayed.

A third exemplary embodiment will now be described with reference to FIG. 13.

The first exemplary embodiment has been described centering on the processing for displaying the drum unit replacement moving image 700, the guidance screen 800, and the calibration setting screen 900 in a case of the drum replacement by the user.

The third exemplary embodiment will be described centering on the processing for guiding the user to the calibration setting screen 900 after the drum replacement in a case where the drum is replaced by a service staff. Since the service staff has knowledge of parts replacement, the display of the drum unit replacement moving image 700 or the guidance screen 800 for guiding the user to a calibration is not required. Thus, the display processing not required for the service staff can be omitted by performing processing for directly displaying the calibration setting screen 900 without displaying the drum unit replacement moving image 700 and the guidance screen 800 for guiding the user to a calibration.

Figure 13:
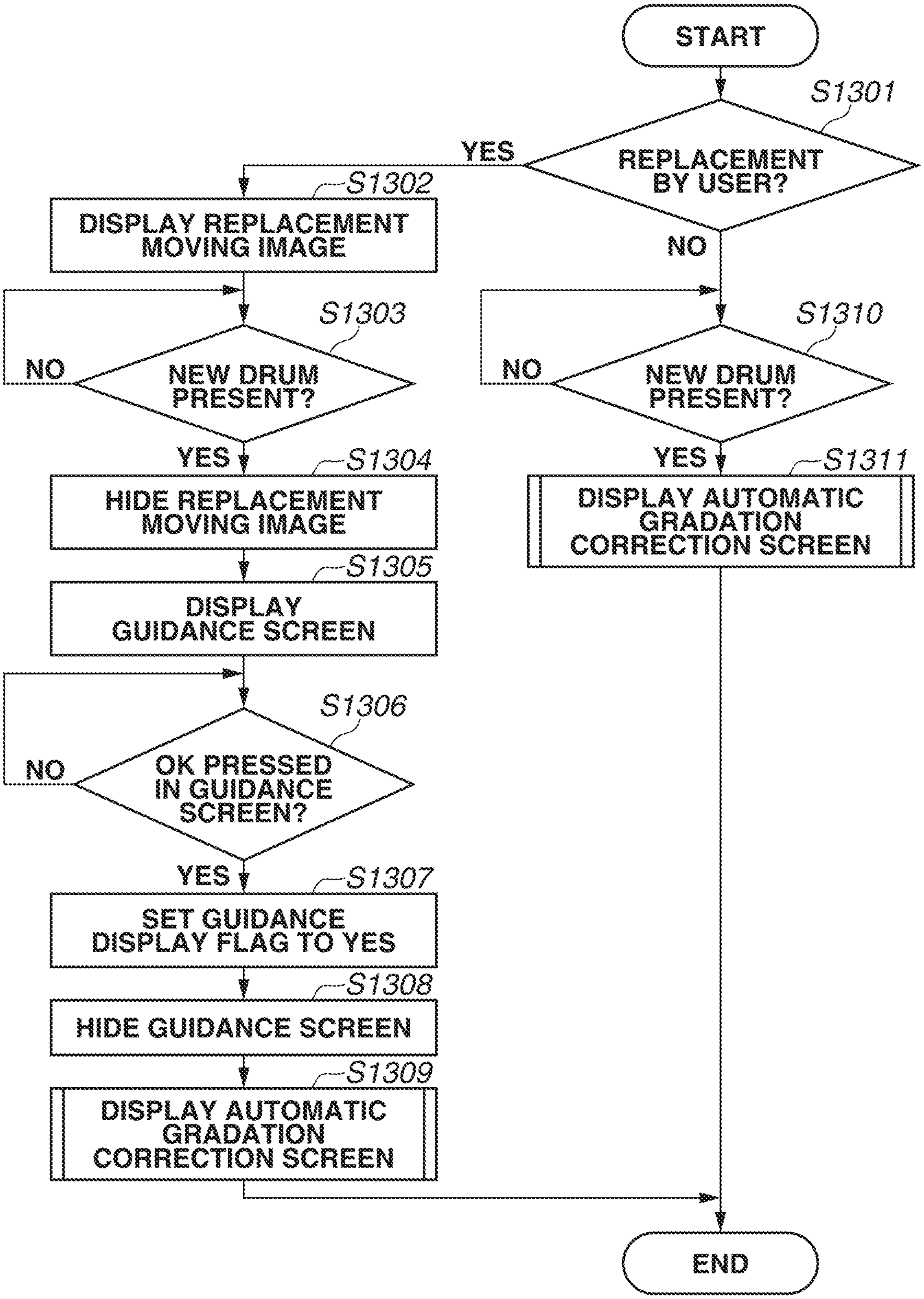
FIG. 13 is a flowchart illustrating processing for executing a calibration based on a guidance screen according to a third exemplary embodiment.

FIG. 13 is a flowchart illustrating processing performed by the image forming apparatus 1. The processing of this flowchart is started when the CPU 201 detects that the drum replacement is required based on the information indicating a failure of the drum unit or assembly 518 of the image forming apparatus 1 or the necessity of the drum replacement stored in the RAM 203. The processing of this flowchart is implemented when the CPU 201 executes a program stored in the ROM 202 or the HDD 204.

Processing of steps S1301 to S1309 is similar to the processing of steps S501 to S509 in FIG. 5, and thus descriptions thereof will be omitted.

In step S1310, the CPU 201 determines whether the drum unit or assembly 518 has been replaced with a new one. As described above, the CPU 201 can identify whether the drum unit or assembly 518 has been replaced with a new one (whether a new drum is present), by reading the memory electrode 121 via the memory interface 321. If the CPU 201 determines that the drum unit or assembly 518 has been replaced with a new one (YES in step S1310), the processing proceeds to step S1311. In contrast, if the CPU 201 determines that the drum unit or assembly 518 has not been replaced with a new one (NO in step S1310), the CPU 201 repeats this processing. The CPU 201 acquires information about the drum unit or assembly 518 from the image forming apparatus 1 and identifies whether the drum unit or assembly 518 has been replaced with a new one.

In step S1311, the CPU 201 executes the calibration execution sub process. This processing is similar to the processing in step S1309 or S509, i.e., the CPU 201 executes the calibration execution sub process illustrated in FIG. 6 or 12, and thus descriptions thereof will be omitted.

As described above, when the drum unit or assembly 518 is replaced with a new one, the CPU 201 directly displays the calibration setting screen 900 in FIGS. 9A and 9B or the calibration execution screen 1100 to the service staff, thereby making it possible to prompt rapid execution of a calibration.

The disclosure has been described above together with exemplary embodiments. The above-described exemplary embodiments are to be considered as illustrative in embodying the disclosure, and are not to be interpreted as restrictive on the technical scope of the disclosure. The disclosure can be embodied in diverse forms without departing from the technical concepts or essential characteristics thereof.

The present exemplary embodiment has been described above centering on the image forming apparatus 1 that integrates the image processing apparatus according to the disclosure. However, the image processing apparatus according to the disclosure can be configured as an apparatus different from the image forming apparatus 1.

According to the above-described exemplary embodiments, the image forming apparatus 1 performs toner-based print processing, but the disclosure is not limited thereto. For example, an ink-jet image forming apparatus for performing ink-based print processing can perform the processing according to the above-described exemplary embodiments.

According to the above-described the exemplary embodiments, the CPU 201 displays the calibration setting screen 900 illustrated in FIG. 9A to prompt the execution of full correction after the replacement of the drum unit or assembly 518. However, the CPU 201 may prompt the execution of quick correction instead of full correction after the drum replacement. Thus, a screen for suitably guide the user to perform quick correction, not full correction, can be displayed as the calibration setting screen 900. In this case, for example, the calibration setting screen 900 does not display the Full Correction button 901 in FIG. 9A but displays the Quick Correction button 904 in FIG. 9B. This enables the user to perform quick correction without getting lost in operations after the drum replacement.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-120174, filed Jul. 28, 2022, which is hereby incorporated by reference herein in its entirety.

What is claimed is:

1. An image forming apparatus comprising:

one or more processors; and at least one memory storing executable instructions, which when executed by the one or more processors, cause the image forming apparatus to:

execute a first calibration that is a calibration using paper;

execute a second calibration that is a calibration not using paper; and in a first notification related to a setting of at least the first calibration, display a first object for prompting execution of the first calibration that is the calibration using paper and not display a second object for prompting execution of the second calibration that is the calibration not using paper.

2. The image forming apparatus according to claim 1, wherein, based on depression of the first object, the image forming apparatus displays a screen for setting paper to be used in the first calibration.

3. The image forming apparatus according to claim 2, wherein, based on operation of an object indicating that the paper to be used in the first calibration is determined in the screen for setting paper, the image forming apparatus displays an object for starting execution of the first calibration.

4. The image forming apparatus according to claim 1, wherein, based on depression of the first object, the image forming apparatus displays a third object for starting execution of the first calibration without displaying a screen for setting paper to be used in the first calibration.

5. The image forming apparatus according to claim 1, wherein the executable instructions, when executed by the one or more processors, further cause the image forming apparatus to execute a guidance notification for prompting the execution of the first calibration, wherein the image forming apparatus displays the first notification based on operation of a fourth object related to the execution of the first calibration displayed in the guidance notification.

6. The image forming apparatus according to claim 5, wherein the guidance notification does not display an object indicating that the first calibration is not to be executed.

7. The image forming apparatus according to claim 5, wherein the executable instructions, when executed by the one or more processors, further cause the image forming apparatus to determine whether the first notification is displayed based on operation of the fourth object, wherein, in a case where the first notification is determined to be displayed based on operation of the object related to the execution of the first calibration in the guidance notification, the image forming apparatus displays the first object and does not display the second object in the first notification, and wherein, in a case where the first notification is determined to be not displayed based on operation of the object related to the execution of the first calibration in the guidance notification, the image forming apparatus displays the first and the second objects in the first notification.

8. The image forming apparatus according to claim 7, wherein the case where the first notification is determined to be not displayed based on operation of the object related to the execution of the first calibration in the guidance notification refers to a case where the first notification is displayed based on operation of the object for prompting the execution of the calibration in a setting screen related to the setting of the calibration.

9. The image forming apparatus according to claim 5, wherein the executable instructions, when executed by the one or more processors, further cause the image forming apparatus to execute a second notification about a drum unit replacement, wherein the image forming apparatus executes the guidance notification based on execution of the second notification and attachment of a new drum unit.

10. The image forming apparatus according to claim 9, wherein the executable instructions, when executed by the one or more processors, further cause the image forming apparatus to:

acquire information about the drum unit from the image forming apparatus for forming an image on paper by using the drum unit; and detect whether the new drum unit has been attached based on the information about the drum unit, wherein the image forming apparatus executes the guidance notification based on detection of attachment of the new drum.

11. The image forming apparatus according to claim 9, wherein, in a case where the image forming apparatus is an apparatus where the drum unit is replaced by a user, the image forming apparatus executes the first notification, the guidance notification, and the second notification, and wherein, in a case where the image forming apparatus is an apparatus where the drum unit is replaced by a service staff, the image forming apparatus does not execute the first notification, the guidance notification, and the second notification.

12. The image forming apparatus according to claim 9, wherein, in a case where the image forming apparatus is an apparatus where the drum unit is replaced by a user, the image forming apparatus executes the first notification, the guidance notification, and the second notification, and wherein, in a case where the image forming apparatus is an apparatus where the drum unit is replaced by a service staff, the image forming apparatus does not execute the first notification and the guidance notification but executes the second notification.

13. The image forming apparatus according to claim 1, wherein the calibration refers to processing for adjusting a tint and a gradation to be displayed by the image forming apparatus.

14. A method for controlling an image forming apparatus, the method comprising:

first executing for executing a first calibration that is a calibration using paper;

second executing for executing a second calibration that is a calibration not using paper; and first displaying for displaying a first object for prompting an execution of the first calibration that is the calibration using paper and not displaying a second object for prompting an execution of the second calibration that is the calibration not using paper, in a first notification related to a calibration setting.

15. A non-transitory storage medium storing a program for causing a computer of an image forming apparatus to execute a method comprising:

first executing for executing a first calibration that is a calibration using paper;

second executing for executing a second calibration that is a calibration not using paper; and first displaying for displaying a first object for prompting an execution of the first calibration that is the calibration using paper and not displaying a second object for prompting an execution of the second calibration that is the calibration not using paper, in a first notification related to a calibration setting.

* * * * *